April 21, 1925.
F. J. FLANAGAN
HEATING DRUM OR RADIATOR
Filed Sept. 18, 1922
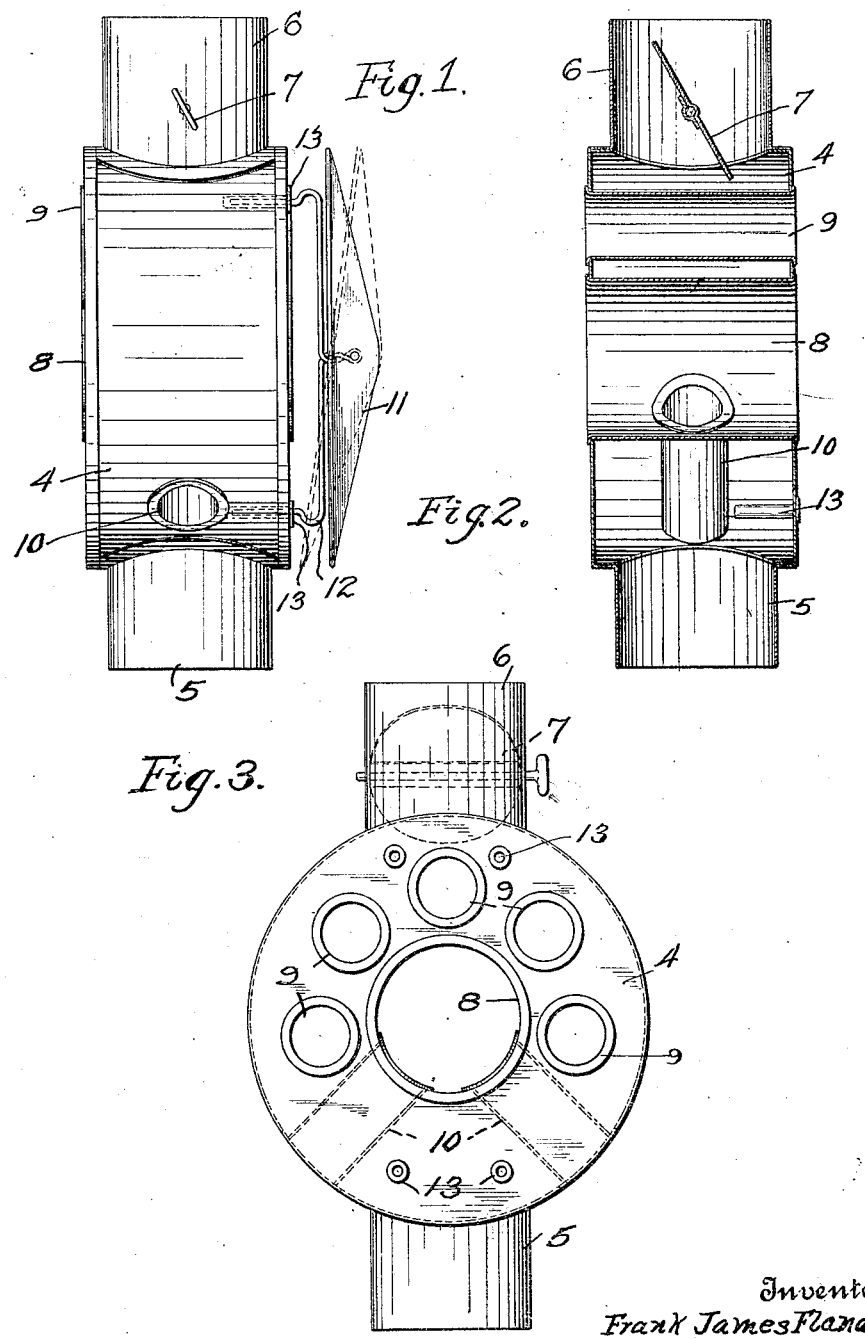
Inventor
Frank James Flanagan
By his Attorney John O. Seifert Patented Apr. 21, 1925.

1,535,072

UNITED STATES PATENT OFFICE.

FRANK JAMES FLANAGAN, OF FREDERICTON, NEW BRUNSWICK, CANADA, ASSIGNOR OF ONE-HALF TO JOSEPH A. CAIN, OF FREDERICTON, CANADA.

HEATING DRUM OR RADIATOR.

Application filed September 18, 1922. Serial No. 588,819.

*To all whom it may concern:*

Be it known that I, FRANK JAMES FLANAGAN, a subject of the King of Great Britain, and a resident of Fredericton, in the county of York, Province of New Brunswick, and Dominion of Canada, have invented certain new and useful Improvements in Heating Drums or Radiators, of which the following is a specification.

This invention relates to heating drums or radiators to be interposed in the pipes or flues of stoves, furnaces and the like whereby to utilize the heat of the products of combustion passing through such pipes for heating purposes, and it is the object of the invention to provide a device of this character in which there is a large surface for the impingement of the products of combustion in its passage through the drum, said surface constituting the walls of air passages through the drum and being arranged so as to provide a smooth wall or passage for the products of combustion thereby preventing the accumulation of soot therein and the clogging of the drum, and to so arrange the air passages and drum that the capacity of the drum and the outlet of the drum is equal to the inlet to the drum, thereby preventing choking and a consequent condensation of the products of combustion in the drum and creation of soot therein.

In the drawing accompanying and forming a part of this specification, Figure 1 is a side elevation of a heating drum or radiator illustrating an embodiment of my invention.

Figure 2 is a sectional side elevation with the heat deflector removed; and

Figure 3 is a front elevation.

Similar characters of reference designate like parts throughout the different views of the drawing.

The embodiment of the invention illustrated in the drawing comprises a drum 4 preferably circular in shape having diametrically opposite disposed tubular or pipe extensions 5, 6 for connection in the flue pipe of a stove, furnace or the like, the pipe extension 5 constituting the inlet to the drum and the pipe 6 the outlet therefrom which may be arranged with a damper 7 manipulable from the exterior for controlling and regulating the draft through the drum. A series of tubes 8 and 9 extend longitudinally through the drum to provide air passages arranged in the path of the flow of the products of combustion through the drum from the inlet 5 to the outlet 6, the walls of the tubes providing a smooth surface thereby preventing the accumulation of soot and the clogging or choking of the drum.

The air passage 8 is arranged centrally or axially of the drum and is of greater cross sectional dimension or diameter than the air passages 9, the latter being grouped about the central air passage 8 and interposed in the passage formed by the wall of the air passage tube 8 and the wall of the drum between said tube 8 and the outlet 6 of the drum, and arranged substantially at one side of a line extending transversely of the drum at right angles to the axis of the outlet 6. The size of the air passages 8 and 9 and drum, and the size of the outlet 6, is such and are so arranged that the capacity of the drum and the outlet is equal to the inlet 5 to prevent the retarding of the flow of the products of combustion in their passage through the drum with a consequent condensation thereof and creation of soot in the drum. Furthermore, by the arranging of the large air passage tube 8 centrally of the drum and the grouping of the air passage tubes 9 about said central passage between said latter passage and the outlet 6 the products of combustion entering the chamber of the drum through the inlet 5 will be impinged against the wall of the air passage tube 8, and by the wall of said latter tube directed laterally and caused to impinge and flow around the air passage tubes 9 in the flow of the products of combustion to the outlet 6. By the impinging of the heated products of combustion against the air passage tubes the walls thereof become heated with a consequent increase in the temperature of the air interior of the tubes and exterior of the drum, thereby creating a circulation of air through the tubular air passages 8 and 9.

To induce a circulation of air through the large central passage 8, air passage tubes 10 are extended radially through the drum from the peripheral wall thereof to the central air passage and arranged adjacent to and in angular relation to the inlet pipe 5 as clearly shown in Figure 2.

To direct the air passing through the air passages of the drum in any desired direction a deflector 11 is provided, said deflector being carried by the drum at one end thereof to have adjustment to different angular positions in relation to the axis of the air passage tubes. As shown this deflector is of sheet metal and conical form pivotally mounted upon a bracket 12 whereby it is supported upon the drum by engaging in thimbles 13 secured in an end wall of the drum. By this arrangement the deflector may have adjustment toward and away from the end of the drum.

Having thus described my invention I claim:

1. In a device for the purpose specified, a cylindrical drum having an inlet pipe and an outlet pipe arranged diametrically opposite in the drum, air passage tubes extending through the drum, and a deflector carried by the drum at one end of the air passage tubes to direct the air passing through the air passage tubes.

2. In a device for the purpose specified, a cylindrical drum having an inlet pipe and an outlet pipe arranged diametrically opposite in the drum; an air passage tube extending axially through the drum; a series of air passage tubes extending through the drum in parallel relation to and circularly disposed about the central tube between said tube and the outlet pipe at one side of a line extending diametrically of the drum at right angles to the axis of the outlet pipe; and radial air passage tubes extending from the outer wall of the drum to the central air tube arranged adjacent to and in angular relation to the inlet pipe to the drum.

3. In a device for the purpose specified, a cylindrical drum having an inlet pipe and an outlet pipe arranged diametrically opposite in the drum; air passage tubes extending longitudinally through the drum and transversely of the inlet and outlet pipes; a deflector; and means to mount said deflector upon the drum to have adjustment in variable angular relation to the drum and toward and away from the drum to deflect the air passing through the air tubes in different directions.

Signed at Fredericton, in the county of York, Province of New Brunswick and Dominion of Canada, this 13th day of September, 1922.

FRANK JAMES FLANAGAN.